Jan. 15, 1952  W. H. FERGUSON  2,582,322
FOLDABLE AND ADJUSTABLE GAMBREL
Filed Nov. 8, 1949
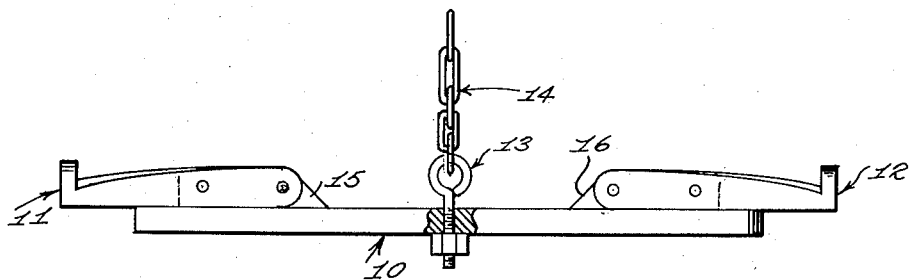
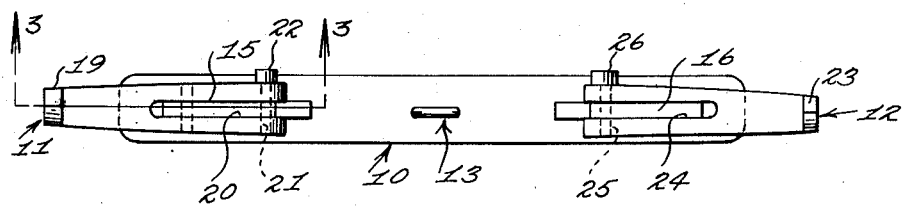
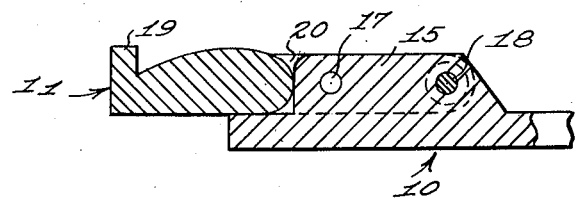
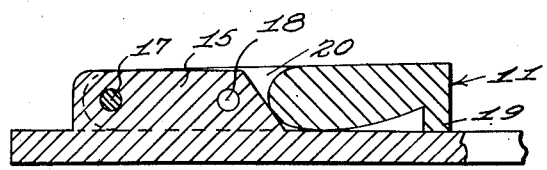
INVENTOR
WALKER H. FERGUSON
BY
McMorrow Berman & Davidson
ATTORNEYS Patented Jan. 15, 1952

2,582,322

UNITED STATES PATENT OFFICE 2,582,322

FOLDABLE AND ADJUSTABLE GAMBREL

Walker H. Ferguson, Midridge, Mo.

Application November 8, 1949, Serial No. 126,226

1 Claim. (Cl. 294—79)

This invention relates to gambrels for supporting animal carcasses, such as beef, veal, lamb and pork carcasses, for dressing, and more particularly to a foldable and adjustable gambrel.

It is among the objects of the invention to provide an improved gambrel which can be easily folded to a compact condition for storage and transportation and readily unfolded for use and can be adjusted as to length to properly suspend animal carcasses of different shapes and sizes, which is of simple and durable construction involving a minimum number of simple parts, and which is economical to manufacture, easy to use and convenient to handle or store.

Other objects and advantages will become apparent from a consideration of the following description and the appended claim in conjunction with the accompanying drawing wherein:

Figure 1 is a side elevation of a gambrel illustrative of the invention, a portion being broken away and shown in cross section to better illustrate the construction thereof;

Figure 2 is a top plan view of the gambrel illustrated in Figure 1;

Fig. 3 is a longitudinal cross section of a fragmentary portion of the gambrel taken on the line 3—3 of Figure 2; and Figure 4 is a view similar to Figure 3, but showing the gambrel in folded condition.

With continued reference to the drawing, the improved gambrel comprises, in general, an elongated flat beam 10, two arms 11 and 12 pivotally secured to the beam 10 at respectively opposite ends of the latter, and an eye 13 secured to the beam 10 at the mid-length location of the latter and projecting from one side of the beam for attachment to a support, such as the chain 14, for suspending the gambrel and an animal carcass carried thereby.

The beam 10 has two elongated ribs 15 and 16 extending outwardly from that surface which is normally the top surface of the beam. These ribs have a length less than one-half the length of the beam and extend longitudinally of the beam substantially in longitudinal alignment with each other and with the longitudinal center line of the beam. They are symmetrically spaced at respectively opposite sides of the eye 13, and have their inner ends spaced somewhat inwardly from the corresponding ends of the beam 10. Each rib is provided with two or more spaced apart apertures extending transversely therethrough as indicated at 17 and 18 in Figure 3.

The arm 11 is an elongated member having a flat under surface normally adjacent the flat upper surface of the beam 10, and has at one end an upwardly extending projection 19 which constitutes a hook at such one end of the arm for engagement under the heel tendon of an animal carcass. At its opposite end the arm is bifurcated to provide a longitudinally extending slot 20 in which the rib 15 is received, as is clearly illustrated in Figure 2. The arm 11 is provided in the bifurcated portion thereof and near the end of such portion with a transversely extending aperture 21, and a pin 22 extends through this aperture in the arm and through a selected one of the apertures in the rib 15 to pivotally connect the arm 11 to the beam 10.

By selecting different apertures in the rib 15, the arm may be located at different distances from the eye 13 or the mid-length location of the beam, both of the arms 11 and 12 being thus adjustable relative to the beam 10 to increase or decrease the length of the gambrel.

Referring to Figures 3 and 4, it will be observed that the arm 11, when in its operative position, extends outwardly of the adjacent end of the beam 10 and that the flat upper surface of the beam underlies the flat bottom surface of the arm and supports the arm in such extended condition, so that the weight of an animal carcass can be supported from the hook end of the arm. When it is desired to transport or store the gambrel the arm 11 is turned upwardly about the pivot pin 22, and then downwardly to the position illustrated in Figure 4, in which it is disposed entirely inward of the adjacent end of the beam 10 and rests upon the flat upper surface of the beam.

The arm 12 is similar in all respects to the arm 11, and has at one end an upstanding projection 23 constituting a hook at this end of the arm, and having at its opposite end a bifurcated formation providing a longitudinally extending slot 24 which receives the rib 16. The rib 16 is provided with spaced apart, transversely extending apertures corresponding to the apertures 17 and 18 of the rib 15, and the arm 12 is provided near the outer end of its bifurcated portion with a transversely extending aperture 25. A pivot pin 26 is inserted through the aperture 25 in the arm 12 and through a selected aperture in the rib 16 to pivotally connect the arm 12 to the beam 10 in adjusted position longitudinally of the beam. The arm 12 is movable about the pin 26 between its extended position, as illustrated in Figures 1 and 2, and its folded position in the same manner as the arm 11 is movable about the pivot pin 22.

Both arms 11 and 12 may be folded inwardly to shorten the length of the gambrel for convenient transportation or storage, and both arms can be quickly swung outwardly to their operative position for use. The length of the gambrel can be adjusted to the size and shape of the carcass to be suspended by removing the pins 22 and 26 and moving the arms 11 and 12 longitudinally of the beam 10 until the desired length is obtained, and then reinserting the pins through the apertures in the arms and through registering apertures in the ribs 15 and 16.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A foldable and adjustable gambrel comprising a flat intermediate beam, ribs on the top side of said beam shorter than said beam, one each of said ribs extending longitudinally of the latter at locations symmetrically spaced at opposite sides of the mid-length location of the beam, said ribs being disposed substantially in longitudinal alignment with each other and each having spaced apart apertures extending transversely therethrough, an eye secured to said beam at the mid-length location of the latter for suspending the gambrel, and two arms pivotally attached to said beam at the respectively opposite ends of the latter, each of said arms having at one end a hook and at its opposite end a bifurcated formation receiving the corresponding rib on said beam and provided with a transverse aperture, and pins extending respectively through the apertures in the bifurcated portions of said arms and through selected apertures in the corresponding ribs to pivotally connect said arms to said beam, said beam underlying said arms to support the latter in position in which they extend outwardly of the ends of said beam.

WALKER H. FERGUSON.

REFERENCES CITED

The following references are of record in the file of this patent:

UNITED STATES PATENTS

| Number | Name | Date |
|---|---|---|
| 901,947 | Brooks | Oct. 27, 1908 |
| 1,373,823 | McClung | Apr. 5, 1921 |
| 1,622,102 | Fuller | Mar. 22, 1927 |
| 2,411,856 | Harding | Dec. 3, 1946 |